Sept. 25, 1928.  
A. GOODFELLOW  
1,685,539  
ELECTROMAGNETIC CARRIER SYSTEM FOR HEAVY PLATES  
Filed March 19, 1925  
7 Sheets-Sheet 1

Sept. 25, 1928. 1,685,539
A. GOODFELLOW
ELECTROMAGNETIC CARRIER SYSTEM FOR HEAVY PLATES
Filed March 19, 1925 7 Sheets-Sheet 4

Inventor.
Alfred Goodfellow.
by
Attorney.

Sept. 25, 1928.  A. GOODFELLOW  1,685,539
ELECTROMAGNETIC CARRIER SYSTEM FOR HEAVY PLATES
Filed March 19, 1925   7 Sheets-Sheet 6

Inventor
Alfred Goodfellow.
by
Attorney.

Sept. 25, 1928.   1,685,539
A. GOODFELLOW
ELECTROMAGNETIC CARRIER SYSTEM FOR HEAVY PLATES
Filed March 19, 1925   7 Sheets-Sheet 7

Inventor
Alfred Goodfellow
by
Attorney

Patented Sept. 25, 1928.

1,685,539

UNITED STATES PATENT OFFICE.

ALFRED GOODFELLOW, OF COATESVILLE, PENNSYLVANIA, ASSIGNOR TO CHARLES L. HUSTON, OF COATESVILLE, PENNSYLVANIA.

ELECTROMAGNETIC CARRIER SYSTEM FOR HEAVY PLATES.

Application filed March 19, 1925. Serial No. 16,672.

My invention relates to reciprocating tools, usually shears for operating upon heavy sheet metal and to means for feeding the heavy sheet metal to the tools.

My main purpose is to provide a feeding device for heavy metal plates embodying grips, normally electromagnetic and a conveyor to convey the plates to position for operation upon them by shears.

A further purpose is to provide for vertical movement of the grips so that they will follow the vertical movements of the plates and conform to the surfaces of the plates even when these surfaces are not truly plane. The grips thus retain their holds to ensure alignment for a succeeding operation or for successive advances of the plate, thereby maintaining an initial setting as long as needed, even throughout a series of operations upon the plate. I also avoid the loss of time and danger from faulty alignment incident to successive placings and clampings.

A further purpose is to provide an electro-magnetic clutch or grip for a plate conveyor system in which the electro-magnets are movable to engage the plate fully and with maximum efficiency and to follow any slight vertical movements of the plate without losing their close engagements with it, falling away from the plate when de-energized so as to permit free movement of the deenergized grip or of the plate without interference of either with the movement of the other.

A further purpose is to provide independently movable drag carriers having electromagnetic grips, gripping the same plate at selected points and maintaining the alignment of the plate while it is being fed through successive plunger tool operations while permitting independent use of the carriers to handle the plates preliminary to and subsequent to the tool operations upon them, securing adaptability in handling and continuous position control prior to, during, and subsequent to the operations upon the plates.

Also to allow a carrier system for heavy plate to follow a plate in upward movement between shearing operations where the plate is lifted free from the shear knives for a succeeding movement, without loosing the magnetic grip on the plate nor the control of the alignment of the plate by the carrier, so that an initial setting will be maintained throughout the range of movement of the plate undisturbed by slight variation in the vertical position of the plate.

Also to use the feeding mechanism to hold the plate during the operation.

By the structures and devices shown, I prevent the plate from shifting or creeping and keep constant control over the position of the plate, holding it securely when desired and transferring it without change in alignment between operations.

I have preferred to illustrate my invention by one general type only though with several different applications, selecting a type which is practical, efficient and thoroughly reliable and which at the same time well illustrates the principles of my invention.

Figures 4ª, 4ᵇ and 4ᶜ are sections corresponding to Figure 4, but showing different positions of the parts.

In the drawings similar numerals indicate like parts.

My invention is intended primarily to serve oppositely facing reciprocating tools 15, 16, which in the drawings are shown as hydraulic shears but which may perform other operations and may be operated by any other power means. The tools shown are opposite counterparts in all particulars except that their knives begin to cut at the corresponding end.

In the delivery of heavy metal plate to cutting tools and particularly to tools cutting concurrently on opposite sides in successive operations along the opposite edges of the plate, initial accurate alignment and maintenance of the alignment of the plate for each step in the operation or for each operation are quite desirable and I have invented mechanism whereby the hold of the grips upon the plate can be continuously maintained during the successive operations though the feeding be not continuous. At the same time the continued hold reduces in any event and for many operations wholly avoids the need of clamping the plate.

Figure 1:
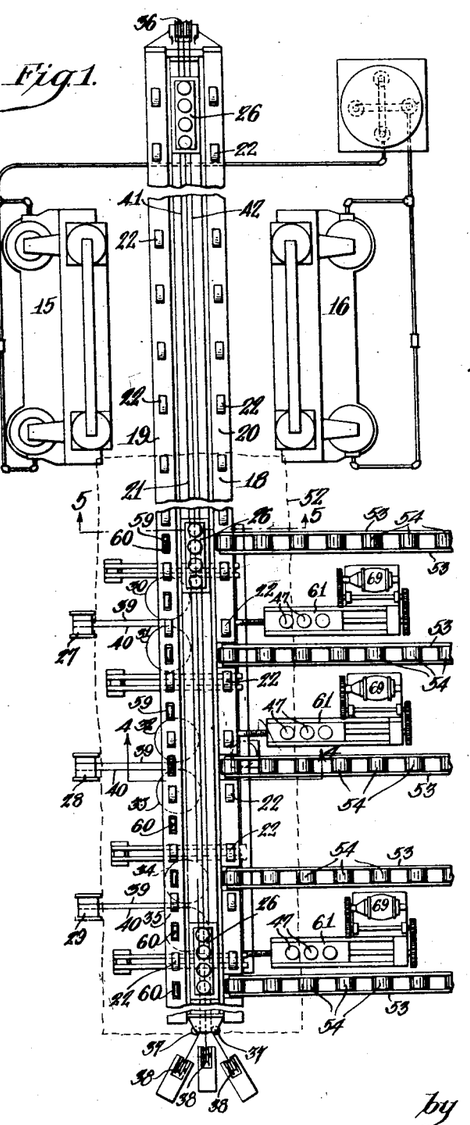
Figure 1 is a top plan view, generally diagrammatic, showing my conveyor in conjunction with transverse feeding tables.

The drag conveyor 18 as shown in Figure 1 comprises parallel supporting frames 19 and 20 between which is located the drag conveyor 21.

The side supporting frames are intended to carry the weight of the plate and to permit the drag conveyor to move the plate along the frame with a minimum of friction. For this reason the frames carry rollers 22 mounted in the frames upon axes transverse to the length of the conveyor.

The conveyor mechanism comprises a central U-shaped frame 23 having oppositely placed side supporting members 24 within which are lock guides 25 for magnetic grips 26 which are moved within the guides longitudinally of the frames by means of cables passing about power operated drums 27, 28, 29, pairs of idlers 30, 31, 32, 33, 34 and 35, idlers 36 and 37 and take-up shives 38.

For convenience in reference the cables passing about these drums, idlers and take-up shives may be divided into stretches 39, 40, 41 and 42 of which stretches 39 and 42 are secured to opposite ends of appropriate magnetic grips operated by the corresponding cables using a separate cable drum, take-up shive and set of idlers for each grip.

Figure 4:
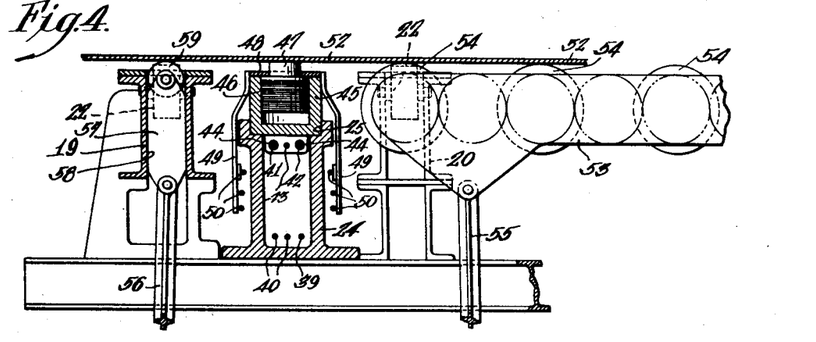
Figure 4 is a fragmentary section of Figure 1 taken upon line 4—4 thereof.
Figure 4A:
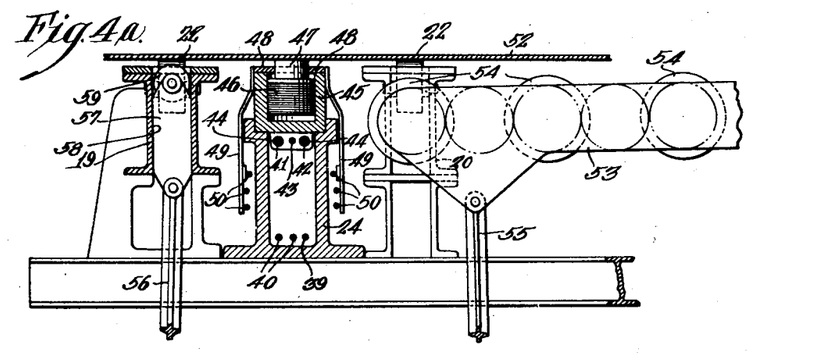
Figure 4B:
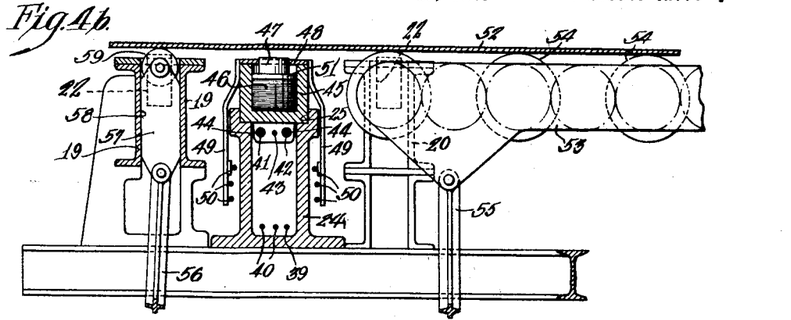
Figure 4C:
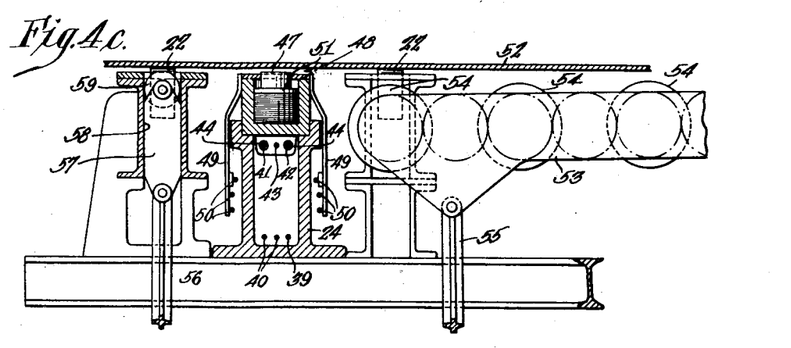

In Figure 4ª, 4ᵇ and 4ᶜ the middle cable of the three is the one attached and the point of attachment is shown at 43, the other cables passing through openings 44 and the other stretches of each cable being shown at 39 or 40 on their lower passages leading to and from the drums to connect ultimately with the opposite ends, respectively of the drag gripping mechanisms.

In use this particular part of the mechanism operates as follows: From any one magnetic grip the cable moving it passes to one of the idlers 37 (except the central one which goes direct) thence to one of the take-up shives 38, about it and along a lower stretch to one of the idlers 31, 33 or 35, to and about corresponding operating drum 27, 28 or 29, thence about one of the idlers 30, 32 or 34, to and about one of the idlers 36 and back to the magnetic grip or clutch.

In the form shown in Figures 1, 2, 4, 5 and 6, the magnetic clutch mechanism comprises a movable box-like holder 45 containing a plurality of magnet windings 46 and magnetic solenoidal gripping cores 47, which pass through and are guided and supported within a top plate 48. The windings may be in series or multiple and the windings for each gripping mechanism receive their current through pairs of trolley arms 49 from the trolley wires 50. Preferably a separate pair of trolley wires is provided for each of the grips so that the energization of the magnets of the grips may be selective, controlled by switching current into or cutting it off from the corresponding wires, by any means not shown.

Since the cores 47 are vertically movable, energization of the electromagnet cores (with or without lifting of the windings) while a plate is located above them will result in the lifting of the magnet cores into engagement with the plate and the cores will follow the vertical movements of the plate within the range of movement provided, maintaining contact notwithstanding variations in the height of the plate above the gripping devices. It is much the best construction, mechanically and electrically to have the windings move with the cores, and the box and cover should be of non-magnetic material. Any suitable additional guides may be provided. The cores are flanged at 51 and the flanges cooperate with the walls of the box to perform guiding functions and to maintain vertical position of the individual gripping members notwithstanding strain upon them, so that these members will maintain contact with the surface of the plate during movement of the plate even while the plate is also lifting and lowering within reasonable limits.

Figure 2:
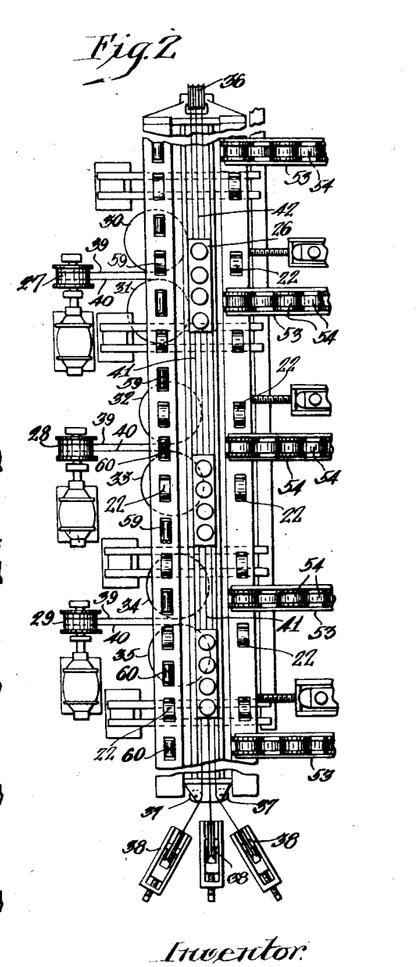
Figure 2 is a fragmentary enlarged plan view, showing in greater detail parts seen in Figure 1.

In Figures 1 and 2, the plate 52 is delivered to the drag conveyor by a laterally disposed roller table which terminates at the end adjacent the drag conveyor in tiltable roller table arms 53, provided with rollers 54 and rocked vertically about a center at the right in all figures but not shown, by means of a thrust arm 55 and mechanism not shown. The same mechanism operates thrust arms 56 by which a plurality of plungers 57 move within guides 58 so as to lift and lower rollers 59.

The rollers 59 are mounted upon axes parallel to the length of the drag conveyor and, therefore, at right angles to the axes of rollers 22 and are lifted and lowered through openings 60 in the surface of frame 19. By this means a plate carried by the tiltable roller tables 53 may be carried by them to a position above the drag conveyor 18 and can be laterally adjusted upon rollers 54 and 59 with ease, until the desired lateral position and alignment (as hereinafter indicated) have been secured. The outer end of the roller table 53 and the rollers 59 are then lowered to rest the plate upon the drag conveyor.

Figure 5:
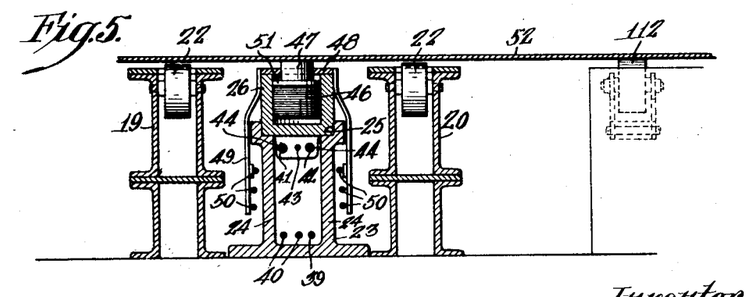
Figure 5 is a section of Figure 1 taken upon line 5—5.
Figure 6:
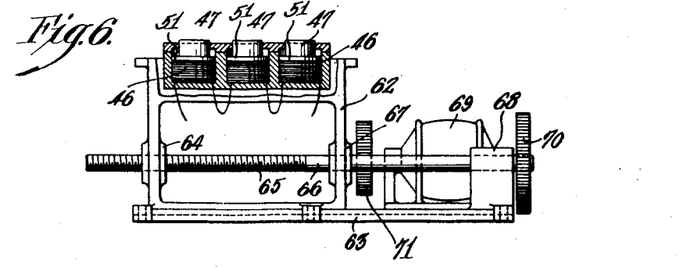
Figure 6 is a vertical longitudinal section of lateral feeding adjustments such as are shown in Figure 1.
Figure 7:
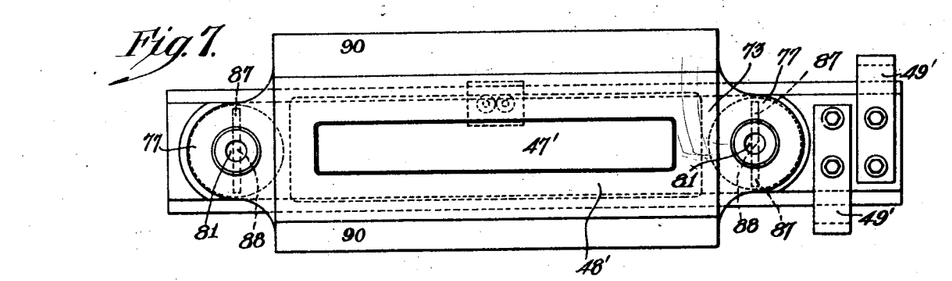
Figure 7 is a top plan view of a second form of gripping devices which may be used.

Between the laterally extending roller table arms 53, and in position to engage the plate carried by these arms, I locate an aligning and adjusting mechanism 61 having magnetic gripping devices of the same general character as those seen in Figures 4, 4ª, 4ᵇ, 4ᶜ and 5, with the exceptions that they are preferably carried by a movable frame 62 instead of being themselves movable in guides and that they do not need to receive their current from trolley or other similar engagement but may be connected up with any source of electrical energy, not shown. For the same reasons that the drags may be greatly varied in type, shape and style, the drag elements of these aligning devices can also be varied.

The guide frame 62 slides in a guide 63 and carries a nut 64 with which thread 65 upon shaft 66 engages. The shaft is supported in bearings 67 and 68 and is turned by motor 69 and any suitable pairs of gears at 70 and 71 with the purpose and intent that any of these aligning and fine-adjusting magnetic gripping devices or all of them at the same time at different points can engage a plate upon the laterally extending roller tables to align or give fine lateral adjustment to the plate while it is supported upon these tables or upon these tables and rollers 39.

By selecting appropriate ones of these aligning and fine adjustment devices, the plate can be shifted or turned in either direction on by a single device or by a plurality of devices operating in the same or opposite directions. One device may be held stationary and may be used as an anchor for plates about which anchor the plates may be swung by one of the other devices. An entire construction by which lateral delivery of the plate to the drag conveyor may be secured, is described and illustrated with a good deal more particularity in my application for fine adjustment and alignment for approach tables, Serial No. 614,149, filed January 22, 1923, as well as various other devices for feeding plates to such a drag conveyor laterally or in line with the conveyor by the use of other mechanisms.

I have not deemed it necessary to include more elaborate descriptions and illustrations of the other devices shown in the illustration of this application, as I believe it to be unnecessary to the claims made herein, but I make reference to this other application in order to lay foundation for illustration and description of any of this other structure illustrated or described, which may at any time prove to be necessary to the claims in this application. This policy has been dictated by the desire to shorten this case per se and to avoid the necessity for what would seem now be needless examination here of the same subject matter as shown in said copending application.

Figure 8:
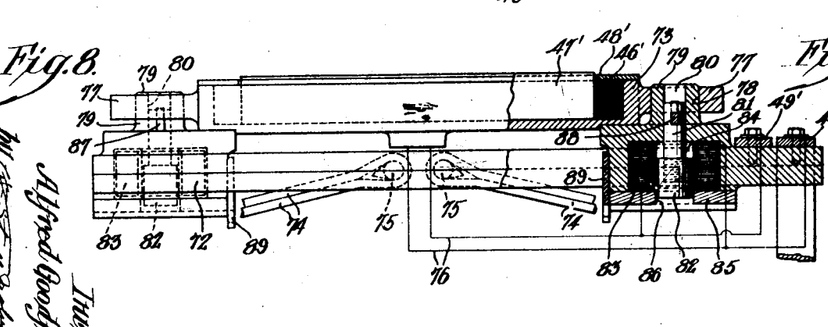
Figure 8 is a fragmentary side elevation partly in longitudinal section of the structure seen in Figure 7.
Figure 9:
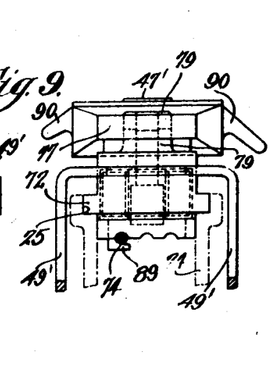
Figure 9 is a fragmentary end elevation of the structure seen in Figure 7.

In Figures 7, 8 and 9 another form of electro-magnetic gripping device is shown capable of use in connection with the drag conveyor as illustrated or for the aligning and adjusting uses or both. It comprises a frame member 72 slidable in the guides 25 and carrying vertically movable electro-magnetic gripping elements or holds 73.

Contact is made with the electrical conductors through trolley straps 49' and connection with the cable ends 74 is made by looping them about pins 75.

The electro-magnet core 47' is energized by a winding 46' to which current is conducted from the trolley straps by wires 76. The electro-magnetic core is preferably not movable within its supporting holder and I prefer to provide the movement between the shell and the frame. The core is protected and retained by a cover plate 48'.

The ends 77 of the electro-magnet holders which are the vertically movable elements are apertured at 78 to fit down over vertical guide members 79 which are preferably hollow to provide inner guiding surfaces 80 for rods 81, extending from solenoid cores 82. The solenoid windings 83 for the solenoid cores 82 are placed within recesses 84 in the main casing or frame. These recesses are closed sufficiently to retain the winding by plates 85 which plates, for convenience, are apertured at 86 to permit movement of the cores 82 through the recess.

The guide openings 80 are laterally extended to form openings 87, preferably in the form of slots, to provide for vertical movement of bars 88 lifted by the solenoids and dropping to place by gravity when the solenoid windings are not energized. Obviously the solenoid windings can be connected in the same or separate circuits from the energizing circuit and in my arrangement they are shown as in multiple with the energizing circuit, so that when the electro-magnet is energized the solenoid windings will be energized and the bars 88 will be lifted lifting the entire electro-magnetic gripping devices into engagement with the work. These devices will drop when the current is cut off.

The operating cables are clamped to position by clamp plates 89.

The surface of the electro-magnetic gripping devices is chamfered to form guiding and protective side surfaces 90.

The several forms of electro-magnetic gripping devices and the drags and aligning and adjusting mechanisms shown form a continuation for certain purposes of my application for fine adjustment and alignment for approach tables, Serial No. 614,149, filed January 22, 1923.

The shears are shown diagrammatically in Figure 1, as for the most part my invention is wholly independent of their character. However, in order that a more complete mechanism for carrying out my invention may be disclosed, I illustrate in Figure 3 one form of shear contemplated by me, which is illustrated and described in more detail in application of Charles L. Huston for facing shears for cutting heavy sheet metal, Serial No. 576,998, filed July 24, 1922 to which I would refer for any further information regarding the construction, making this reference to avoid what seems to me likely to prove unnecessary description of the same in the present application.

Figure 3:
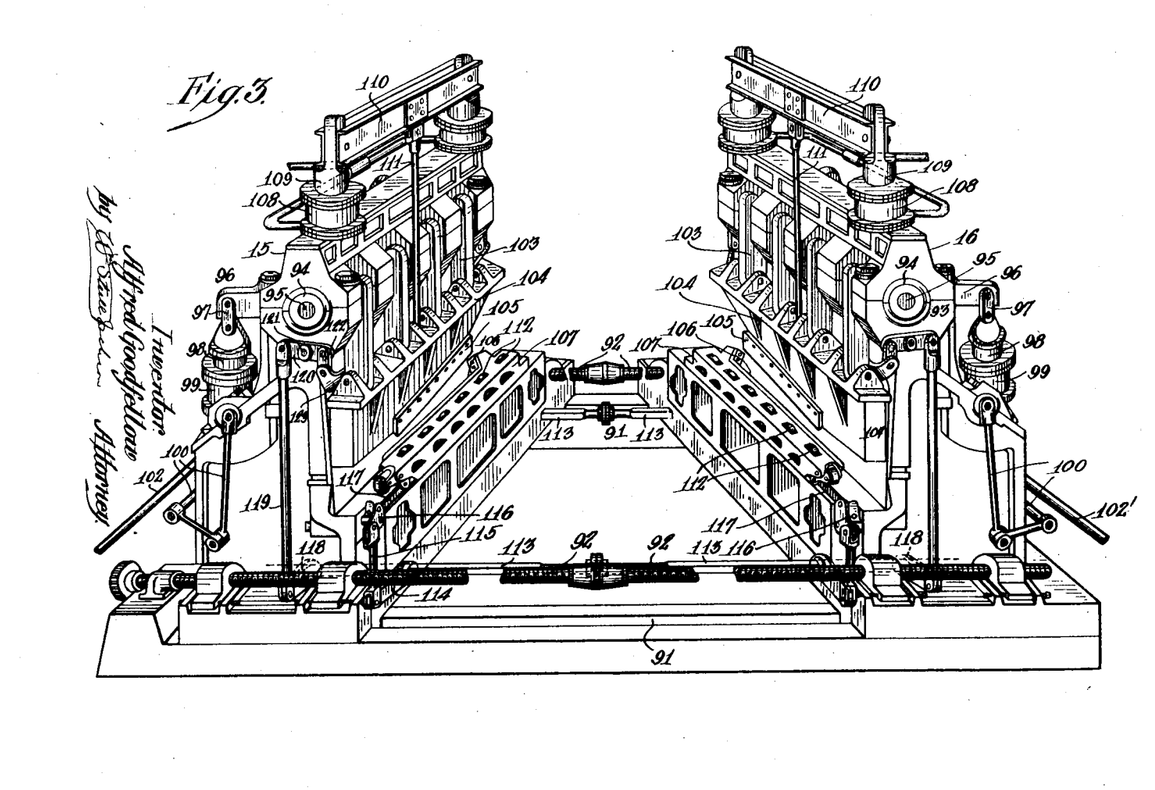
Figure 3 is a perspective view omitting the conveyor but showing tools of a type which may be served by it.

The shears are opposite counter-parts and are mounted upon parallel guides 91. They are drawn together or separated uniformly by inter-geared adjusting screws 92. The bases support frames 93 within which are bearings 94 for rock shafts 95 having rock arms 96 operated through links 97, by plungers 98 of hydraulic cylinders 99.

The hydraulic cylinders are fed through piping 100, hinged to adjust the length between the inlet and outlet ends, receiving water from opposite pairs 102, 102' of high pressure intensifier cylinders so that the two shears are operated synchronously.

Rocker shafts 95 operate through links 103 to lift and permit lowering of movable beams 104 carrying movable shear knives 105 cooperating with fixed shear knives 106 in beams 107. The pull-back cylinders 108, plungers 109, beam 110 and rods 111 provide for return movement of the movable beams.

Figure 14:
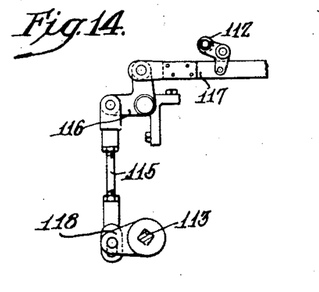
Figure 14 is a fragmentary section of the plate lifting mechanism at the shears seen in Figure 3.

Within or in close conjunction to the fixed beams 107, supporting idlers 112 are lifted to support the work free from the fixed shear knives when the work is to be moved and are lowered to lower the work upon these knives when shearing is intended to take place. This is provided by shafts 113 suitably driven, as seen in the Huston application, connecting by arms 114, links 115, bell cranks 116 and links 117 with a series of bell cranks upon which the rollers 112 are supported.

But one shaft 113 need be used for operating these rollers. Both shafts 113 are preferably used for another purpose, namely through levers 118, rods 119 and levers 120 pivoted at 121, to lift links 122 and wedges 123. The lifting of these wedges releases the movable beams so that the cutting knives may fall away from the work and may be lifted free from and without disturbance to the work. When the wedges are lowered they hold the knives to their position of duty for cutting purposes. The movable beams do not hang down directly from the supports for the links but lie forward sufficiently so that by gravity they are held back firmly against their guides. The front faces of the wedges 123 act as guides holding the knife beams and knives to duty or releasing according to the position of the guides vertically with respect to the sloping frame surfaces against which the wedges operate.

The conveyor system may be used for any of the conveying and holding functions or for all of them, either maintaining its hold continuously throughout the successive feeding and cutting operations or successively gripping to perform or assist in one or more operations and releasing to grip again. In the initial setting it may be used for rough positioning alone or, preferably, for exact placing, according to the accuracy of the initial placing and the perfection of alignment of the feed. It may continue to hold the plates or to assist in holding them in alignment during all or any of the cutting operations and release of the plate by lateral movement of the knives preparatory to the lifting of the knives for another cutting operation, also during the lifting of the plates and their transfer to the next position and during the lowering of the plates for the successive and progressive cutting operations. The conveyors would operate to transfer the plates and to hold them during cutting even if the rollers 112 were not lifted to relieve the friction of transfer and if there were no means of relieving friction in their own constructions, but the operation is facilitated by the lifting of the rollers 112 and, where the rollers 22 are lifted, by their upward movement. At the same time the proper gripping of the plates and the retention of holds upon the plates when and while the plates are in raised position is facilitated greatly by the bodily upward movement provided for the grips.

As my invention contemplates the use of any of a variety of conveying systems for delivery to conveyors in conjunction with coincident shears, I have illustrated in Figures 10, 11, 12 and 13 a variety of methods of transportation which provide for alignment, adjustment and conveying of the metal plates from the rolls or from receiving tables to the shears.

Figures 10, 11:
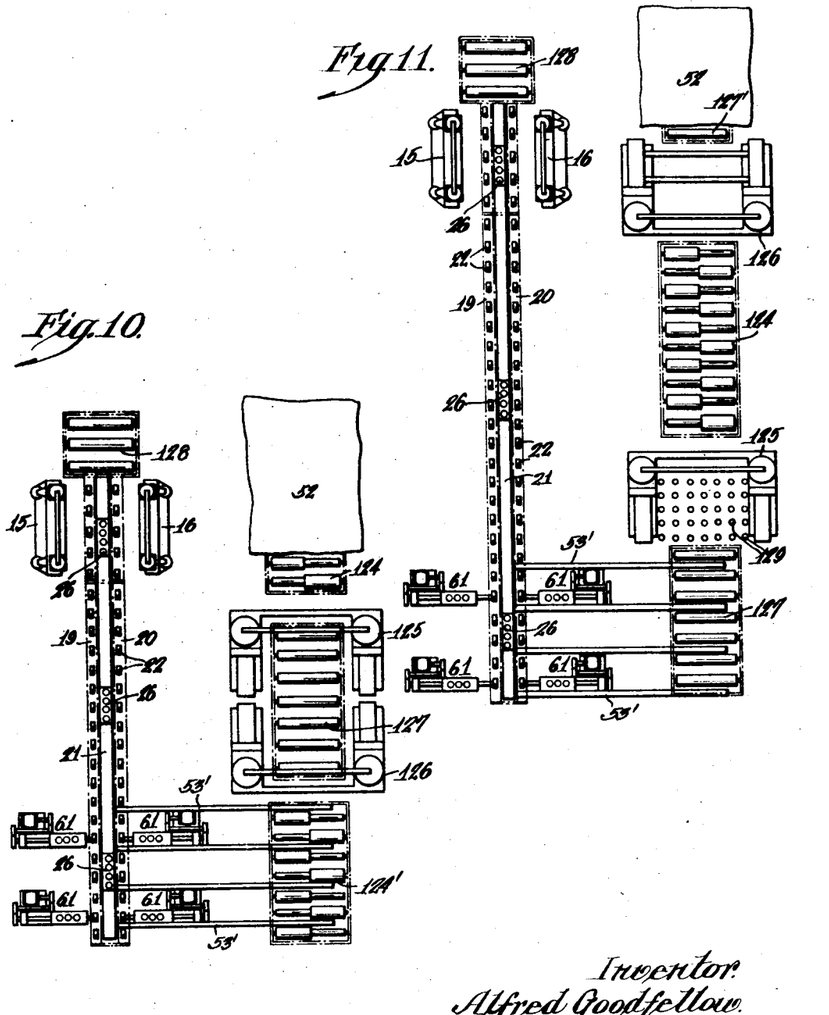
Figures 10, 11, 12 and 13 are top plan views showing four different assemblages in which my drag feed may be used.

In Figures 10 and 11, along with cooperating transfer tables 53' shown broadly and corresponding in general function with those shown in Figures 1 and 2, I have shown construction intended to be used in some one of its various forms in Figures 1 and 2 but not there illustrated, by which the plates 52 are received from the rolls, are transported from the rolls through the end shears and are roughly aligned for transfer.

In Figure 10 a plate is seen upon manipulating rollers 124 of which alternate rollers may be rotated at different speeds or in different directions so that the plate can be roughly aligned for shearing by oppositely facing end-cutting shears 125 and 126. The plate is handled between the shears by roller table 127 and is delivered from its rollers to manipulate rollers 124' of the general character and capable of the movements of rollers 124, where further rough adjustment of the plate can take place before it is delivered to the transfer table 53' for delivery to the drag conveyor 21. In this view adjusting and aligning devices 61, capable of the movements of devices 61 in the other views, are placed on both sides of the drag conveyor 21 and electro-magnetic cable-drawn drags or grips 26 carry the plate to the shears 15 and 16 and beyond the shears the plate is handled by any suitable roller table 128 for delivery of the plate to the point where it is to be weighed or loaded or to other point of discharge. The conveyor and shears shown are intended to be generic and, so far as desired, to have all the capabilities and to perform all the functions of those shown in the earlier figures.

In Figure 11 the construction shown corresponds generally to that shown in Figure 10, except that the shears 125, 126 face each other instead of being placed back to back. But one table of manipulating rollers 124 is shown, located between the shears and plain roller tables 127' and 127 are placed outside the shears. Casters 129 are used to assist in handling the plates.

Figure 12:
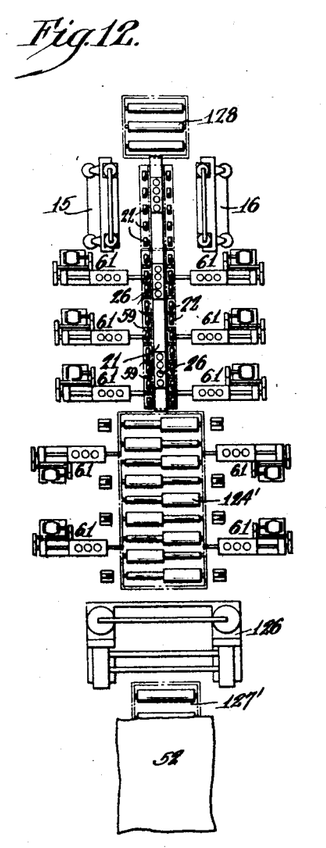
Figure 13:
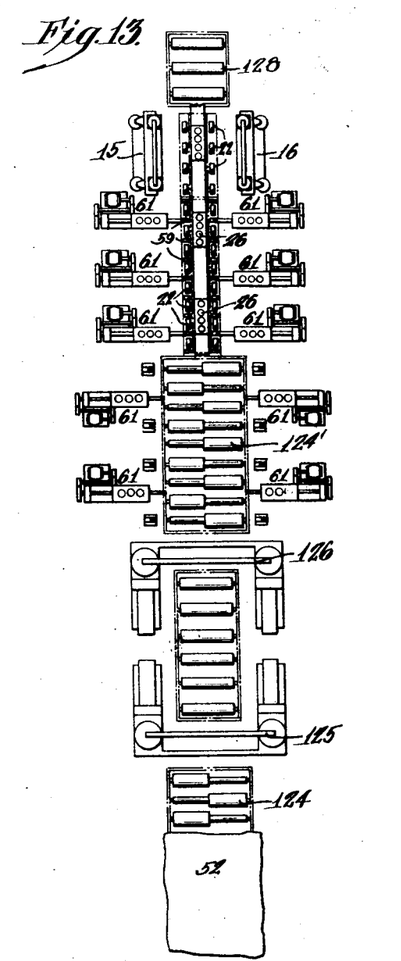

In the form shown in Figures 12 and 13 the plate goes directly from the mill through the shears to the drag conveyor without need of lateral transfer.

In Figure 12 the plate 52 passes from the rolls to roller table 127' and through end-cutting shear 126 to manipulating rollers 124' which deliver it directly to the drag conveyor, whose drags conveniently assist. The plate may be roughly aligned by the manipulating table and may be further centered and aligned by the adjusting and aligning devices 61 placed upon opposite sides of the manipulating rollers and upon opposite sides of the drag conveyor so that the plate may be fully aligned before coming to the shears 15 and 16 and, ultimately to the roller table 128 for such distribution of the plate as is desired.

In Figure 13 on the other hand the initial arrangement is comparable more nearly with that shown in Figure 10 in that the plate is handled first by manipulating rollers 124, thence passes through oppositely facing shears 125, 126, back to back, travelling between them upon a roller table, and is then delivered to other manipulating rollers 124' from which it is passed directly to the drag conveyor. In this case also there are adjusting and aligning devices such as 61 on opposite sides of the manipulating rollers and/or on opposite sides of the drag conveyor to give full opportunity for proper handling of the plate to align it and place it properly upon the drag conveyor. Obviously, if the rough adjustments secured by the manipulating rollers near the conveyor be not needed they can be substituted by any other transfer mechanism of which a plain roller table is an example.

In this application, as in my previous application for fine adjustment and alignment for approach tables, Serial No. 614,149, filed January 22, 1923, herein above referred to, I wish to distinguish from the broad inventions embodying a conveyor and oppositely facing guillotine shears served thereby claimed in a copending application of Charles L. Huston, for transfer system for heavy metal plates, Serial No. 616,563, filed February 2, 1923.

My disclosure herein will suggest to others skilled in the art various ways in which my structure may be modified to obtain the advantage of all or a part of my invention without using the same mechanical means. It is my purpose therefore to include herein all such modifications and changes as come within the reasonable spirit and scope of my invention.

Having thus described my invention, what I claim as new and desire to secure by Letters Patent is:—

1. The process of transferring heavy metal plate and cutting it in step by step operation, which consists in gripping the plate electromagnetically from below, in progressing the plate to an initial setting above the shearing position by movement of the electro-magnet while maintaining the grip, lowering the plate, operating upon the plate concurrently upon opposite sides, raising it and shifting the plate while maintaining alignment by the shifting means to a setting for repetition of the operation.

2. The process of transferring heavy metal plate and shearing it in step by step operation, which consists in gripping the plate electromagnetically against one of its sides, in progressing the plate to an initial setting above the shearing position by movement of the electro-magnet while maintaining the grips, lowering the plate while maintaining the hold of the grips and progressing means, shearing the plate concurrently upon opposite sides, raising it while maintaining the magnet grips and shifting the plate to a setting for repetition of the operation while maintaining alignment through the grips.

3. The process of transferring and shearing heavy metal plate which consists in aligning the plate, resiliently gripping the plate electromagnetically, longitudinally transferring the plate and maintaining alignment by mechanically moving the gripping means into position for shearing along its sides, shearing the plate concurrently on opposite sides, utilizing the pressures on opposite sides to balance each other and protect from variation in position of the plate, and transferring the plate longitudinally by the same gripping means while maintaining its alignment into a new shearing position and repeating the operation.

4. The process of transferring and shearing heavy metal plate which consists in aligning the plate, resiliently gripping the plate electromagnetically, longitudinally transferring the plate and maintaining alignment by mechanically moving the gripping means into position for shearing along its sides, lowering the plate to cutting position while maintaining the hold of the gripping means, shearing the plate concurrently on opposite sides, raising the plate and transferring the plate longitudinally by the same gripping means while maintaining its alignment into a new shearing position and repeating the operation.

5. The process of transferring and concurrently shearing heavy metal plate which consists in electromagnetically gripping the plate against one of its sides, dragging the electromagnetic gripping means and with them the plate to position the plate over opposite lower shear knives while permitting and means to follow variations in height of the plate by variation in the height of the electro-magnetic means and shearing the plate at opposite sides while maintaining the hold of the drag upon the gripping means to hold the plate during the shearing, utilizing the shearing pressures on opposite sides of the plate to balance each other and protect against displacement of the plate.

6. The process of transferring and concurrently shearing heavy metal plate which consists in electromagnetically gripping the plate against one of its sides, dragging the electro-magnetic gripping means and with them the plate to position the plate over opposite lower shear knives while following variations in height of the plate by bodily movement up or down of the electro-magnets, maintaining the hold of the drag upon them and lowering the plate to position upon the shears at the same time lowering the electro-magnets and maintaining the hold of the drag thereon and shearing the plate.

7. In conveying and aligning mechanism, a pair of oppositely facing guillotine shears, means for lifting and lowering a plate extending across from shear to shear, a conveyor between the shears adapted to deliver plates to them, to advance the plates between strokes of the shears, and to convey them away from the shears to other handling mechanism, electro-magnetic grips carried by the conveyor adapted when energized to shift vertically into engagement with the plate and maintain operative connection with the conveyor while the plate is lowered, sheared and subsequently lifted, and electric current supply for the grips.

ALFRED GOODFELLOW.